United States Patent
Lee et al.

(10) Patent No.: US 10,976,229 B2
(45) Date of Patent: Apr. 13, 2021

(54) METHOD FOR PREPARING A SYNTHETIC RESIN FILAMENT IN A MELT BLOWING PROCESS FROM RHEOLOGICAL PROPERTIES OF THE SYNTHETIC RESIN

(71) Applicant: LG Chem, Ltd., Seoul (KR)

(72) Inventors: Hyun Sup Lee, Daejeon (KR); Ki Soo Lee, Daejeon (KR); Sang Jin Jeon, Daejeon (KR); Sang Eun An, Daejeon (KR); Myung Han Lee, Daejeon (KR); Hee Kwang Park, Daejeon (KR); Sang Eun Kim, Daejeon (KR); Sang Hoon Lee, Daejeon (KR)

(73) Assignee: LG Chem, Ltd.

( * ) Notice: Subject to any disclaimer, the term of this patent is extended or adjusted under 35 U.S.C. 154(b) by 127 days.

(21) Appl. No.: 16/090,732

(22) PCT Filed: Aug. 31, 2017

(86) PCT No.: PCT/KR2017/009566
§ 371 (c)(1),
(2) Date: Oct. 2, 2018

(87) PCT Pub. No.: WO2018/074732
PCT Pub. Date: Apr. 26, 2018

(65) Prior Publication Data
US 2019/0113428 A1 Apr. 18, 2019

(30) Foreign Application Priority Data

Oct. 17, 2016 (KR) .................. 10-2016-0134569

(51) Int. Cl.
| | |
|---|---|
| *G01N 11/00* | (2006.01) |
| *G01N 11/14* | (2006.01) |
| *B29C 49/78* | (2006.01) |
| *D01D 5/098* | (2006.01) |

(52) U.S. Cl.
CPC .............. *G01N 11/00* (2013.01); *B29C 49/78* (2013.01); *G01N 11/14* (2013.01); *D01D 5/0985* (2013.01); *D10B 2321/022* (2013.01); *G01N 2011/004* (2013.01); *G01N 2011/0033* (2013.01)

(58) Field of Classification Search
CPC ........... G01N 2011/0033; G01N 11/00; G01N 11/14; G01N 2011/004; B29C 49/78; D01D 5/0985; D10B 2321/022
See application file for complete search history.

(56) References Cited

U.S. PATENT DOCUMENTS

| | | | |
|---|---|---|---|
| 3,790,438 A * | 2/1974 | Lewis | D02G 3/02 428/367 |
| 5,652,376 A | 7/1997 | Deleeuw et al. | |
| 2002/0116987 A1 * | 8/2002 | Braithwaite | G01N 11/00 73/54.01 |
| 2005/0182198 A1 | 8/2005 | Cheng et al. | |
| 2009/0283939 A1 | 11/2009 | Turner et al. | |
| 2010/0190405 A1 | 7/2010 | Takebe et al. | |
| 2014/0163126 A1 | 6/2014 | Tran et al. | |

FOREIGN PATENT DOCUMENTS

| | | |
|---|---|---|
| CN | 1175686 A | 3/1998 |
| CN | 1918228 A | 2/2007 |
| CN | 103380242 A | 10/2013 |
| JP | 2002114450 A | 4/2002 |
| JP | 2007083602 A | 4/2007 |
| JP | 2007145914 A | 6/2007 |
| JP | 2009062667 A | 3/2009 |
| JP | 2013107261 A | 6/2013 |
| JP | 2016053241 A | 4/2016 |
| JP | 2016118570 A | 6/2016 |
| KR | 100340584 B1 | 11/2002 |
| KR | 20110021147 A | 3/2011 |
| WO | 2009001871 A1 | 12/2008 |
| WO | 2010087921 A8 | 3/2011 |

OTHER PUBLICATIONS

Extended European Search Report for Application No. EP17862536.4 dated Apr. 11, 2019.
Chinese Search Report for Application No. 201780021756.6 dated Dec. 23, 2019, 2 pages.
Andreassen et al., "Infrared Spectroscopy Measurements of Residual Stresses in Polypropylene Fibers", Journal of Applied Polymer Science, May 4, 1993, vol. 50, pp. 1715-1721.
Ghosh et al., "Predictive models for strength of spun yarns: an overview", AUTEX Research Journal, Mar. 2005, vol. 5, No. 1, pp. 20-29.
International Search Report for Application No. PCT/KR2017/009566 dated Dec. 8, 2017.
Wente et al., "Manufacture of Superfine Organic Fibers" , Naval Research Laboratories, Report No. 4364, Chemistry Division, published May 25, 1954.

* cited by examiner

*Primary Examiner* — Lisa M Caputo
*Assistant Examiner* — Alex T Devito
(74) *Attorney, Agent, or Firm* — Lerner, David, Littenberg, Krumholz & Mentlik, LLP

(57) ABSTRACT

The present invention relates to a method for predicting the break-up possibility of a synthetic resin filament in a melt blowing process from the rheological properties of the synthetic resin. According to the present invention, a method that is capable of predicting the break-up possibility of the synthetic resin filament in the melt blowing process for preparing a filament using the synthetic resin in advance, through the measurement of the rheological properties of the synthetic resin, is provided.

5 Claims, No Drawings

METHOD FOR PREPARING A SYNTHETIC RESIN FILAMENT IN A MELT BLOWING PROCESS FROM RHEOLOGICAL PROPERTIES OF THE SYNTHETIC RESIN

CROSS-REFERENCE TO RELATED APPLICATIONS

This application is a national phase entry under 35 U.S.C. § 371 of International Application No. PCT/KR2017/009566, filed Aug. 31, 2017, which claims priority to Korean Patent Application No. 10-2016-0134569, filed Oct. 17, 2016, the disclosures of which are incorporated herein by reference.

TECHNICAL FIELD

The present invention relates to a method for predicting the break-up possibility of a synthetic resin filament in a melt blowing process for preparing a filament using the synthetic resin, before conducting the process.

BACKGROUND OF ART

A synthetic resin is processed in various forms such as a film or fiber, and is widely used.

For example, a spunbond non-woven fabric made of a synthetic resin has excellent feel, flexibility, air-permeability, heat insulation property, etc., and thus is widely used as a filter, packaging material, bedding, clothing, medical supplies, hygienic goods, automobile interior materials, building materials, etc.

In general, a spunbond non-woven fabric is prepared through a melt blowing process using a synthetic resin as a raw material. The melt blowing process is conducted as a series of processes of spinning a liquid synthetic resin into multiple continuous filaments by blowing a gas such as air, and winding while drawing it.

However, during the spinning and drawing processes in the melt blowing process, if breaking-up of the synthetic resin filament is generated, quality of the filament and the overall efficiency of the process may be deteriorated. For this reason, it is advantageous for a break-up of the synthetic resin filament to not be generated in the melt blowing process.

However, since it is generally determined whether or not such a break-up is generated while conducting the melt blowing process, there is still uncertainty in the performance of the melt blowing process, and the production and development of products are affected.

DETAILED DESCRIPTION OF THE INVENTION

Technical Problem

It is an object of the present invention to provide a method that is capable of predicting the break-up possibility of a synthetic resin filament in a melt blowing process for preparing a filament using a synthetic resin in advance, through measurement of rheological properties of the synthetic resin.

Technical Solution

According to the present invention, a method for predicting the break-up possibility of a synthetic resin filament in a melt blowing process is provided, including the steps of:

applying 200% strain to a synthetic resin sample at 235° C., and then measuring a change in residual stress with passage of time; and confirming whether or not the change in residual stress fulfills the following Mathematical Formula 1.

$$(RS_1/RS_0) * 100 \leq 0.04 \quad \text{[Mathematical Formula 1]}$$

In Mathematical Formula 1, $RS_0$ is residual stress at one time point ($t_0$) of less than 0.05 seconds after applying 200% strain to the synthetic resin sample at 235° C., and $RS_1$ is residual stress at one time point ($t_1$) between 0.05 seconds and 2.00 seconds after applying 200% strain to the synthetic resin sample at 235° C.

Hereinafter, a method for predicting the break-up possibility of according to embodiments of the invention will be explained in detail.

First, technical terms in the present specification are only for mentioning specific embodiments, and they are not intended to restrict the present invention unless there is a particular mention about them.

Singular expressions used herein may include plural expressions unless they are differently expressed contextually.

The meaning of the terms "include" and "comprise" used in the specification embody specific characteristics, areas, essences, steps, actions, elements, and/or components, and do not exclude existence or addition of other specific characteristics, areas, essences, steps, actions, elements, components, and/or groups.

As a result of continuous studies by the present inventors, it was confirmed that in a melt blowing process using a synthetic resin as a raw material, if a change in residual stress of the synthetic resin deviates from specific conditions, the break-up possibility of the synthetic resin filament increases.

Thus, it was confirmed that the break-up possibility of a synthetic resin filament in a melt blowing process for preparing a filament using the synthetic resin can be predicted in advance, through measurement of rheological properties of the synthetic resin.

According to one embodiment of the invention, a method for predicting the break-up possibility of a synthetic resin filament in the melt blowing process is provided, including the steps of:

applying 200% strain to a synthetic resin sample at 235° C., and then measuring a change in residual stress with passage of time; and confirming whether or not the change in residual stress fulfills the following Mathematical Formula 1.

$$(RS_1/RS_0) * 100 \leq 0.04 \quad \text{[Mathematical Formula 1]}$$

In Mathematical Formula 1, $RS_0$ is residual stress at one time point ($t_0$) of less than 0.05 seconds after applying 200% strain to the synthetic resin sample at 235° C., and $RS_1$ is residual stress at one time point ($t_1$) between 0.05 seconds to 2.00 seconds after applying 200% strain to the synthetic resin sample at 235° C.

The method for predicting the break-up possibility of according to one embodiment of the invention is carried out by applying a large strain to a synthetic resin under an environment similar to the process conditions for conducting melt blowing to conduct a stress relaxation test, and confirming whether or not a change in the residual stress measured through the test fulfills the above Mathematical Formula 1.

Mathematical Formula 1 represents the condition under which the ratio of the residual stresses measured at $t_0$ and $t_1$ in the stress relaxation test $[(RS_1/RS_0)*100]$ is equal to or less than 0.04%.

Preferably, the ratio of the residual stresses is equal to or less than 0.04%, 0.01 to 0.04%, or 0.02 to 0.03%.

That is, according to one embodiment of the invention, if the ratio of the residual stress according to Mathematical Formula 1 is equal to or less than 0.04%, the break-up possibility of the synthetic resin filament decreases when conducting melt blowing using a corresponding synthetic resin as a raw material. To the contrary, if the ratio of the residual stresses according to Mathematical Formula 1 is greater than 0.04%, the break-up possibility of the synthetic resin filament increases when conducting melt blowing using the corresponding synthetic resin as raw material.

In Mathematical Formula 1, $RS_0$ denotes the residual stress immediately after [for example, at one time point ($t_0$) of less than 0.05 seconds] after applying 200% strain to the synthetic resin sample at 235° C. Further, in Mathematical Formula 1, $RS_1$ denotes the residual stress within about 1.5 seconds after $t_0$ [for example, at one time point ($t_1$) between 0.05 seconds and 2.00 seconds] under the same conditions as the $RS_0$.

Specifically, in Mathematical Formula 1, $t_0$ may be selected from 0.01 seconds, 0.015 seconds, 0.02 seconds, 0.025 seconds, 0.03 seconds, 0.035 seconds, 0.04 seconds, or 0.045 seconds. In addition, in Mathematical Formula 1, $t_1$ may be selected from 0.05 seconds, 0.10 seconds, 0.20 seconds, 0.30 seconds, 0.40 seconds, 0.50 seconds, 0.60 seconds, 0.70 seconds, 0.80 seconds, 0.90 seconds, 1.00 seconds, 1.10 seconds, 1.20 seconds, 1.30 seconds, 1.40 seconds, 1.50 seconds, 1.60 seconds, 1.70 seconds, 1.80 seconds, 1.90 seconds, or 2.00 seconds.

Preferably, in order to easily secure effective data when measuring the residual stress, it may be preferable that $t_0$ is 0.02 seconds and $t_1$ is 1.00 seconds in Mathematical Formula 1.

Further, the step of measuring a change in the residual stress is conducted under an environment (for example, 235° C.) that is similar to the process conditions for conducting melt blowing.

The temperature of 235° C. is a temperature that is suitable for completely melting the synthetic resin to conduct melt blowing, and examples of synthetic resins that are suitable for the temperature may include polypropylene, polystyrene, polyamide, polyethylene, and polycarbonate.

Among the synthetic resins, polypropylene that is commonly used for the preparation of a spunbond non-woven fabric may be appropriately used in the prediction method according to one embodiment of the invention.

According to another embodiment of the invention, the synthetic resin fulfilling Mathematical Formula 1 has properties fulfilling the following Mathematical Formula 2.

$$(M_w*10^{-5})*(MWD^{0.5}) \leq 3.0 \quad \text{[Mathematical Formula 2]}$$

In Mathematical Formula 2, $M_w$ is the weight average molecular weight of the synthetic resin (g/mol), and MWD is the molecular weight distribution of the synthetic resin.

In Mathematical Formula 2, $(M_w*10^{-5})*(MWD^{0.5})$ is a polymer structure factor (PSF), which is a combined factor of weight average molecular weight ($M_w$, g/mol) and molecular weight distribution (MWD).

According to one embodiment of the invention, by confirming the condition of the polymer structure factor (PSF) represented by Mathematical Formula 2, it can be indirectly confirmed whether or not Mathematical Formula 1 is fulfilled.

Preferably, in Mathematical Formula 2, a polymer structure factor (PSF) may be 3.00 or less, 2.50 to 3.00, 2.70 to 2.99, or 2.71 to 2.97.

Specifically, if the polymer structure factor (PSF) according to Mathematical Formula 2 is 3.0 or less, a corresponding synthetic resin fulfills Mathematical Formula 1, and thus, the break-up possibility of the synthetic resin filament decreases when conducting melt blowing using the corresponding synthetic resin as a raw material.

To the contrary, if the polymer structure factor (PSF) according to Mathematical Formula 2 is greater than 3.0, the rheological properties of the corresponding synthetic resin become poor and Mathematical Formula 1 cannot be fulfilled, and thus the break-up possibility of the synthetic resin filament increases when conducting melt blowing using the corresponding synthetic resin as a raw material.

According to yet another embodiment of the invention, the synthetic resin fulfilling Mathematical Formula 1 has properties fulfilling the following Mathematical Formula 3.

$$HMW \leq 2.5 \quad \text{[Mathematical Formula 3]}$$

In Mathematical Formula 3, HMW is the content (wt %) of the polymer having a molecular weight (M, g/mol) of $\log(M) \geq 5.9$.

In Mathematical Formula 3, HMW denotes the content (wt %) of the polymer having an ultrahigh molecular weight in the synthetic resin. In the present invention, the ultrahigh molecular weight means a molecular weight (M) of $\log(M) \geq 5.9$.

That is, Mathematical Formula 3 denotes a condition under which the content of the polymer having a molecular weight of 800,000 g/mol or more is 2.5 wt % or less.

According to one embodiment of the invention, by confirming the condition of the content of the polymer having an ultrahigh molecular weight represented by Mathematical Formula 3, it can be indirectly confirmed whether or not Mathematical Formula 1 is fulfilled.

Preferably, in Mathematical Formula 3, the content of the polymer with an ultrahigh molecular weight) (HMW) may be 2.50 wt % or less, 1.00 to 2.50 wt %, 1.20 to 1.95 wt %, or 1.25 to 1.90 wt %.

Specifically, if the content of the polymer with an ultrahigh molecular weight according to Mathematical Formula 3 is equal to or less than 2.5 wt %, the corresponding synthetic resin fulfills Mathematical Formula 1, and the break-up possibility of the synthetic resin filament decreases when conducting melt blowing using the corresponding synthetic resin as raw material.

To the contrary, if the content of the polymer with an ultrahigh molecular weight according to Mathematical Formula 3 is greater than 2.5 wt %, the rheological properties of the corresponding synthetic resin become poor and Mathematical Formula 1 cannot be fulfilled, and thus, the break-up possibility of the synthetic resin filament increases when conducting melt blowing using the corresponding synthetic resin as a raw material.

As explained above, through the measurement of the ratio of the residual stresses of the synthetic resin, the break-up possibility of the synthetic resin filament during melt blowing can be predicted in advance. Further, the ratio of residual stress is influenced by the weight average molecular weight, molecular weight distribution, and content of ultrahigh molecular weight of the synthetic resin.

Advantageous Effects

According to the present invention, a method that can predict the break-up possibility of a synthetic resin filament in a melt blowing process for preparing a filament using the synthetic resin in advance, through measurement of rheological properties of the synthetic resin, is provided.

DETAILED DESCRIPTION OF THE EMBODIMENTS

Hereinafter, preferable examples will be presented for better understanding of the invention. However, these examples are presented only for illustration of the invention, and the present invention is not limited thereby.

Synthesis Example 3 g of silica was weighed in advance in a Schlenk Flask, and then 52 mmol of methyl aluminoxane (MAO) was put therein to react them at 90° C. for 24 hours. After precipitation, the supernatant was removed and the residue was washed with toluene twice. Then, 180 μmol of a solution of [(6-t-butoxyhexylmethylsilane-diyl)-bis(2-methyl-4-tert-butylphenylindenyl)] zirconium dichloride in toluene was added thereto, and they were reacted at 70° C. for 5 hours. After the reaction was completed and the precipitation was finished, the supernatant solution was removed and the remaining reaction product was washed with toluene and then washed with hexane again, and vacuum dried to obtain 5 g of a silica supported metallocene catalyst in the form of solid particles.

Precipitation Examples 1 to 14

1.5 mmol of triethylaluminum, 2 bar of hydrogen, and 770 g of propylene were sequentially introduced into a 2 L stainless reactor and vacuum dried at 65° C., and cooled to room temperature. Thereafter, they were stirred for 10 minutes, and then 0.030 g of the silica supported metallocene catalyst of a synthesis example was dissolved in 20 ml of TMA treated hexane and introduced into the reactor under nitrogen pressure. Thereafter, the temperature of the reactor was slowly raised to 70° C., and polymerization was conducted for 1 hour. After the reaction was completed, unreacted propylene was removed to obtain a polypropylene resin.

In the above preparation method, the content of propylene, polymerization reaction time, etc. were controlled to obtain polypropylene resins of Preparation Examples 1 to 14 shown in the following Table 1.

Experimental Example 1

For the polypropylene resins of Preparation Examples 1 to 14, each sample was taken and 200% strain was applied at 235° C., and then a change in the residual stress was measured for 10 minutes.

For the measurement of the residual stress, a Discovery Hybrid Rheometer (DHR) from TA Instruments was used, and the sample was sufficiently loaded between the upper and lower plates with diameters of 25 mm and dissolved at 235° C., and then the gap was fixed to 1 mm for measurement.

Based on the measured residual stress data, it was confirmed whether or not the ratio of residual stresses (RS %) fulfills the following Mathematical Formula 1', and the results are shown in the following Table 1.

$$(RS_1/RS_0)*100 \leq 0.04 \quad \text{[Mathematical Formula 1']}$$

In Mathematical Formula 1', $RS_0$ is the residual stress at 0.02 seconds ($t_0$) after applying 200% strain to the synthetic resin sample at 235° C., and $RS_1$ is the residual stress at 1.00 seconds ($t_1$) after applying 200% strain to the synthetic resin sample at 235° C.

Experimental Example 2

For the polypropylene resins of Preparation Examples 1 to 14, 10 mg of each sample was taken and subjected to GPC analysis to measure molecular weight (Mw), molecular weight distribution (MWD), and the content of polymer having a molecular weight of log(M)≥5.9.

Based on the measured data relating to molecular weight, it was confirmed whether or not the polymer structure factor (PSF) and the content of polymer with ultrahigh molecular weight (HMW) fulfill the following Mathematical Formulas 2 and 3, and the results are shown in the following Table 1.

$$(M_w * 10^{-5}) * (MWD^{0.5}) \leq 3.0 \quad \text{[Mathematical Formula 2]}$$

In Mathematical Formula 2, Mw is the weight average molecular weight of the synthetic resin, and MWD is the molecular weight distribution of the synthetic resin.

$$HMW \leq 2.5 \quad \text{[Mathematical Formula 3]}$$

In Mathematical Formula 3, HMW is the content of polymer (wt %) having a molecular weight (M) of log(M) ≥5.9.

Experimental Example 3

A melt blowing process was conducted using the polypropylene resins according to Preparation Examples 1 to 14 as raw materials to prepare a spunbond non-woven fabric.

Specifically, using a 25 mm twin-screw extruder, a master batch of polypropylene resin and Exolit (trademark) OP 950 additive (2.5 wt %) was prepared, and then it was pelletized. Subsequently, the master batch pellets were extruded into an extra fine denier fiber web by a process similar to that described in the document [Report No. 4364 of the Naval Research Laboratories, published May 25, 1954 entitled "Manufacture of Superfine Organic Fibers" by V. A. Wente, E. L. Boone, and C. D. Fluharty], except that, using a 31 mm Brabender cone form twin screw extruder, the molten master batch composition was fed to a melt pump (65 rpm), and then fed to a melt blowing die with a width of 25 cm having outlets (10 outlets/cm) with an outlet diameter of 381 μm.

The melting temperature was 235° C., the screw velocity was 120 rpm, the die was maintained at 235° C., the primary air temperature and pressure were respectively 300° C. and 60 kPa (8.7 psi), the polymer treatment velocity was 5.44 kg/hr, and the collector/die distance was 15.2 cm.

In addition, whether or not break-up was generated in the melt blowing process is shown in the following Table 1.

TABLE 1

| Preparation Example | RS % (%) | Mw (g/mol) | MWD | PSF | HMW (wt %) | Generation of break-up |
|---|---|---|---|---|---|---|
| 1 | 0.12 | 186918 | 2.91 | 3.19 | 3.09 | ◯ |
| 2 | 0.15 | 191984 | 2.78 | 3.20 | 3.22 | ◯ |

TABLE 1-continued

| Preparation Example | RS % (%) | Mw (g/mol) | MWD | PSF | HMW (wt %) | Generation of break-up |
|---|---|---|---|---|---|---|
| 3 | 0.05 | 183327 | 2.69 | 3.01 | 2.68 | ○ |
| 4 | 0.13 | 185567 | 2.79 | 3.10 | 2.88 | ○ |
| 5 | 0.09 | 186549 | 2.87 | 3.16 | 3.18 | ○ |
| 6 | 0.03 | 180786 | 2.27 | 2.72 | 1.50 | X |
| 7 | 0.03 | 183519 | 2.26 | 2.76 | 1.41 | X |
| 8 | 0.07 | 180000 | 2.85 | 3.04 | 3.01 | ○ |
| 9 | 0.08 | 187000 | 3.00 | 3.24 | 3.43 | ○ |
| 10 | 0.07 | 181388 | 2.85 | 3.06 | 3.08 | ○ |
| 11 | 0.04 | 190735 | 2.42 | 2.97 | 1.90 | X |
| 12 | 0.16 | 237193 | 2.35 | 3.64 | 4.01 | ○ |
| 13 | 0.03 | 178103 | 2.52 | 2.83 | 1.42 | X |
| 14 | 0.03 | 178002 | 2.31 | 2.71 | 1.28 | X |

Referring to Table 1, the polypropylene resins of Preparation Examples 6, 7, 11, 13, and 14 fulfilling the requirement of Mathematical Formula 1 did not generate a break-up in the melt blowing process using the polypropylene resin as a raw material, thus making it possible to continuously conduct the process. It was also confirmed that the polypropylene resins of Preparation Examples 6, 7, 11, 13, and 14 fulfill the requirements of Mathematical Formula 2 and Mathematical Formula 3.

To the contrary, the polypropylene resins of Preparation Examples 1, 2, 3, 4, 5, 8, 9, 10, and 12 that failed to fulfill the requirement of Mathematical Formula 1 generated a break-up in the melt blowing process using the polypropylene resin as a raw material, and thus the process could not be continuously conducted. It was also confirmed that the polypropylene resins of Preparation Examples 1, 2, 3, 4, 5, 8, 9, 10, and 12 did not fulfill the requirements of Mathematical Formula 2 or Mathematical Formula 3.

The invention claimed is:

1. A method for preparing a synthetic resin filament, comprising:

applying 200% strain to a synthetic resin sample at 235° C., and then measuring a change in residual stress with passage of time;

confirming whether or not the change in residual stress fulfills the following Mathematical Formula 1:

$(RS_1/RS_0)*100 \leq 0.04$ [Mathematical Formula 1]

wherein, in Mathematical Formula 1, $RS_0$ is residual stress at one time point ($t_0$) of less than 0.05 seconds after applying 200% strain to the synthetic resin sample at 235° C., and $RS_1$ is residual stress at one time point ($t_1$) between 0.05 seconds and 1.50 seconds after applying 200% strain to the synthetic resin sample at 235° C.; and conducting a melt blowing process using a synthetic resin sample fulfilling the Mathematical Formula 1 to prepare the synthetic resin filament.

2. The method for preparing the synthetic resin filament according to claim 1, wherein in the Mathematical Formula 1, $t_0$ is 0.02 seconds and $t_1$ is 1.00 seconds.

3. The method for preparing the synthetic resin filament according to claim 1, wherein the synthetic resin sample fulfilling Mathematical Formula 1, has properties fulfilling the following Mathematical Formula 2:

$(M_w*10^{-5})*(MWD^{0.5}) \leq 3.0$ [Mathematical Formula 2]

wherein, in Mathematical Formula 2,

Mw is the weight average molecular weight of the synthetic resin (g/mol),

MWD is the molecular weight distribution of the synthetic resin.

4. The method for preparing the synthetic resin filament according to claim 1, wherein the synthetic resin sample fulfilling Mathematical Formula 1 has properties fulfilling the following Mathematical Formula 3:

$HMW \leq 2.5$ [Mathematical Formula 3]

wherein, in Mathematical Formula 3, HMW is a content (wt %) of the polymer having a molecular weight (M, g/mol) of log(M)≥5.9.

5. The method for preparing the synthetic resin filament according to claim 1, wherein the synthetic resin sample is polypropylene.

* * * * *